United States Patent
Birnbaum et al.

(10) Patent No.: US 9,778,744 B2
(45) Date of Patent: Oct. 3, 2017

(54) ORIENTATION ADJUSTABLE MULTI-CHANNEL HAPTIC DEVICE

(71) Applicant: Immersion Corporation, San Jose, CA (US)

(72) Inventors: David Birnbaum, Oakland, CA (US); Satvir Singh Bhatia, San Jose, CA (US); Stephen D. Rank, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 14/959,077

(22) Filed: Dec. 4, 2015

(65) Prior Publication Data

US 2016/0085308 A1    Mar. 24, 2016

Related U.S. Application Data

(63) Continuation of application No. 14/030,181, filed on Sep. 18, 2013, now Pat. No. 9,207,764.

(51) Int. Cl.
  *G06F 3/01* (2006.01)
  *G06F 1/16* (2006.01)

(52) U.S. Cl.
  CPC ............ *G06F 3/016* (2013.01); *G06F 1/1688* (2013.01); *G06F 2200/1637* (2013.01)

(58) Field of Classification Search
  CPC . G06F 3/016; G06F 1/1688; G06F 2200/1637
  See application file for complete search history.

(56) References Cited

U.S. PATENT DOCUMENTS

| 7,082,570 | B1 |  | 7/2006 | von Wiegand et al. |
| 9,207,764 | B2 | * | 12/2015 | Birnbaum ............... G06F 3/016 |
| 2006/0066574 | A1 |  | 3/2006 | Kim et al. |
| 2006/0119572 | A1 |  | 6/2006 | Lanier |
| 2007/0226646 | A1 |  | 9/2007 | Nagiyama et al. |
| 2007/0242040 | A1 |  | 10/2007 | Ullrich et al. |
| 2008/0174550 | A1 | * | 7/2008 | Laurila ................... A63F 13/02 345/158 |
| 2009/0001855 | A1 |  | 1/2009 | Lipton et al. |
| 2009/0280860 | A1 |  | 11/2009 | Dahlke |
| 2011/0128132 | A1 |  | 6/2011 | Ullrich et al. |
| 2011/0163946 | A1 |  | 7/2011 | Tartz et al. |
| 2012/0041436 | A1 | * | 2/2012 | Ullrich ................... A61B 18/12 606/39 |
| 2012/0138658 | A1 | * | 6/2012 | Ullrich ................. A61B 17/072 227/175.1 |
| 2012/0143182 | A1 | * | 6/2012 | Ullrich ............... A61B 18/1445 606/45 |

FOREIGN PATENT DOCUMENTS

| EP | 2487557 A2 | 8/2012 |
| EP | 2605490 A1 | 6/2013 |
| WO | 2010119397 A2 | 10/2010 |

OTHER PUBLICATIONS

Any information that are not included with this Information Disclosure Statement can be found in U.S. Appl. No. 14/030,181.

* cited by examiner

*Primary Examiner* — Tom Sheng

(74) *Attorney, Agent, or Firm* — Miles & Stockbridge P.C.

(57) ABSTRACT

A system that generates haptic effects on a haptically-enabled device determines an orientation of the haptically-enabled device and obtains one or more haptic effect channels. The system then assigns each of the haptic effect channels to a haptic output device on the haptically-enabled device based on the orientation.

20 Claims, 3 Drawing Sheets

ORIENTATION ADJUSTABLE MULTI-CHANNEL HAPTIC DEVICE

CROSS-REFERENCE TO RELATED APPLICATIONS

This application is a continuation of U.S. patent application Ser. No. 14/030,181, filed on Sep. 18, 2013, the specification of which is hereby incorporated by reference.

FIELD

One embodiment is directed generally to haptic effects, and in particular to haptic effects generated by a multi-channel device.

BACKGROUND INFORMATION

Portable/mobile electronic devices, such as mobile phones, smartphones, camera phones, cameras, personal digital assistants ("PDA"s), etc., typically include output mechanisms to alert the user of certain events that occur with respect to the devices. For example, a cell phone normally includes a speaker for audibly notifying the user of an incoming telephone call event. The audible signal may include specific ringtones, musical tunes, sound effects, etc. In addition, cell phones may include display screens that can be used to visually notify the users of incoming phone calls.

In some mobile devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

SUMMARY

One embodiment is a system that generates haptic effects on a haptically-enabled device. The system determines an orientation of the haptically-enabled device and obtains one or more haptic effect channels. The system then assigns each of the haptic effect channels to a haptic output device on the haptically-enabled device based on the orientation.

DETAILED DESCRIPTION

One embodiment is a haptically-enabled device/system that includes more than one haptic channel. For example, the device can include a left haptic channel that generates haptic effects predominately on the left side of the device, and a right haptic channel that generates haptic effects substantially independent of the left haptic channel and predominately on the right side of the device. The haptic device may be handheld/mobile and may change orientation (e.g., turned 180 degrees) during usage. Therefore, embodiments determine the current orientation and route the haptic channels accordingly so that they match up with the current orientation. In general, embodiments map haptic signals with respect to an actuator spatial arrangement of the device.

Figure 1:
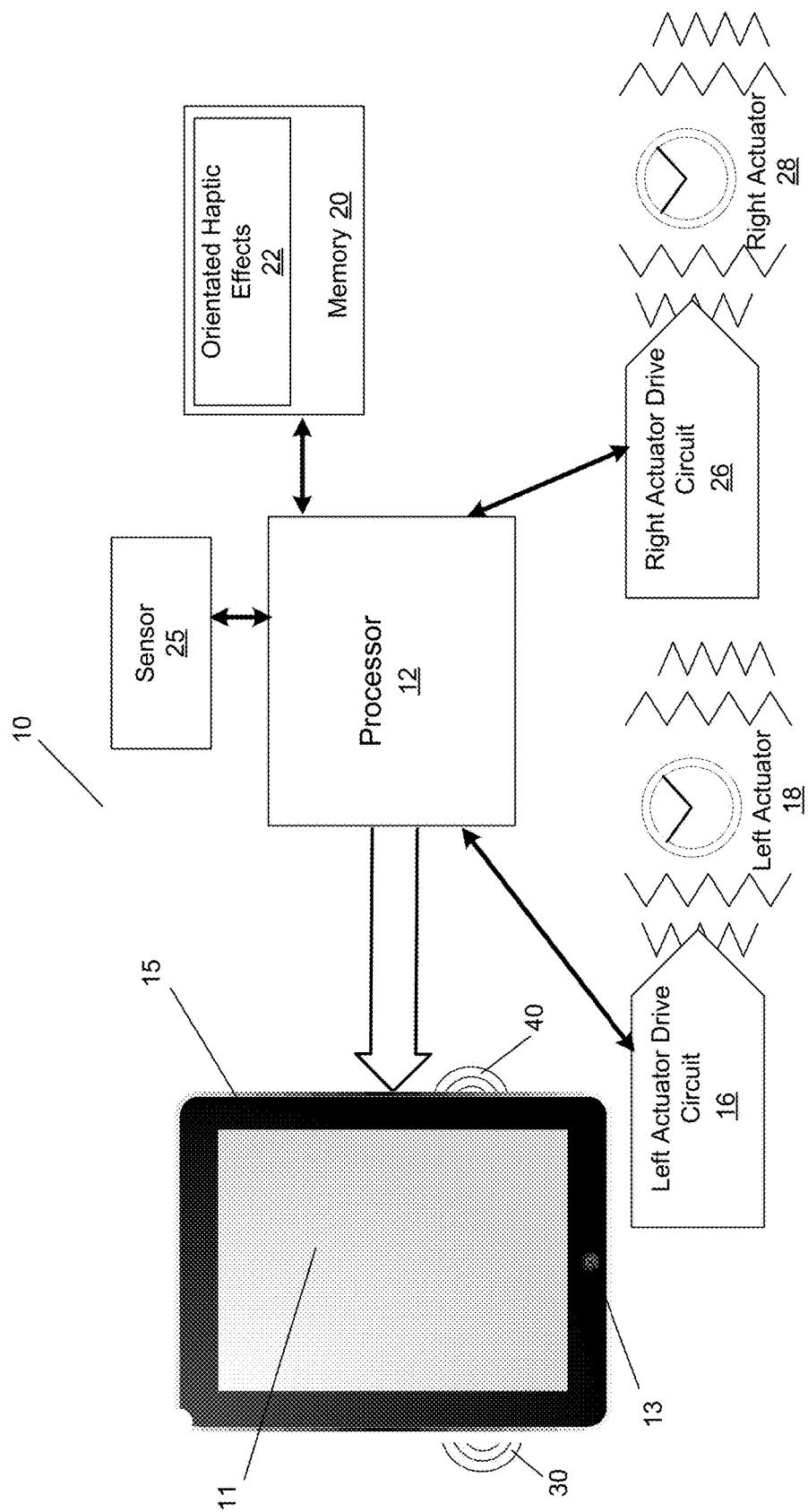
FIG. 1 is a block diagram of a haptically-enabled system in accordance with one embodiment of the present invention.

FIG. 1 is a block diagram of a haptically-enabled system 10 in accordance with one embodiment of the present invention. System 10 includes a touch sensitive surface 11 or other type of user interface mounted within a housing 15, and may include mechanical keys/buttons 13. Internal to system 10 is a haptic feedback system that generates vibrations on system 10. In one embodiment, the vibrations are generated on touch surface 11.

The haptic feedback system includes a processor or controller 12. Coupled to processor 12 is a memory 20 and a left actuator drive circuit 16, which is coupled to a left actuator 18. Actuator 18 may be any type of actuator that can generate and output a haptic effect including, for example, an electric motor, an electro-magnetic actuator, a voice coil, a linear resonant actuator, a piezoelectric actuator, a shape memory alloy, an electro-active polymer, a solenoid, an eccentric rotating mass motor ("ERM") or a linear resonant actuator ("LRA").

Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high-level parameters. In general, the high-level parameters that define a particular haptic effect include magnitude, frequency, and duration. Low-level parameters such as streaming motor commands could also be used to determine a particular haptic effect.

Processor 12 outputs the control signals to left actuator drive circuit 16, which includes electronic components and circuitry used to supply left actuator 18 with the required electrical current and voltage (i.e., "motor signals") to cause the desired haptic effects. In addition, system 10 include a right actuator drive circuit 26 and a right actuator 28, that operate substantially the same as the corresponding left side devices. Left actuator 18 can be positioned within system 10 to generate a vibratory haptic effect 30 predominantly on the left side of system 10, and right actuator 28 can be positioned within system 10 to generate a vibratory haptic effect 40 predominantly on the right side of system 10. System 10 further includes a sensor 25 that detects the orientation of system 10, such as an accelerometer, tilt sensor, three-dimensional detection sensor, etc. Signals from sensor 25 can be used by processor 12 to determine the location or overall spatial arrangement of all of the haptic output devices of system 10.

In addition to or in place of actuators 18, 28, system 10 may include other types of haptic output devices (not shown) that may be non-mechanical or non-vibratory devices such as devices that use electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, etc.

In other embodiments, actuators 18, 28 and sensor 25 may be in remote communication to processor 12. In these embodiments, processor 12 may receive signals from sensor 25, determine a mapping of haptic effects based on the signals, and transmit the haptic effects to the corresponding remote haptic output devices. For example, processor 12 and system 10 may be a central controller that controls and provides haptic effects to wearable haptic devices such as wrist bands, headbands, eyeglasses, rings, leg bands, arrays integrated into clothing, etc., or any other type of device that a user may wear on a body or can be held by a user and that is haptically enabled. The wearable devices include one or more haptic output devices that generate haptic effects on the wearable devices and are remote from system 10.

Memory 20 can be any type of storage device or computer-readable medium, such as random access memory ("RAM") or read-only memory ("ROM"). Memory 20 stores instructions executed by processor 12. Among the instructions, memory 20 includes an orientated haptic effects module 22 which are instructions that, when executed by processor 12, generate orientation adjustable drive signals sent to drive circuits 16, 26 to generate haptic effects, as disclosed in more detail below. Memory 20 may also be located internal to processor 12, or be any combination of internal and external memory.

Touch surface 11 recognizes touches, and may also recognize the position and magnitude of touches on the surface. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images.

System 10 may be a handheld device, such a cellular telephone, personal digital assistant ("PDA"), smartphone, computer tablet, gaming console, wearable device, or may be any other type of device that includes a haptic effect system that includes one or more actuators. The user interface may be a touch sensitive surface, or can be any other type of user interface such as a mouse, touchpad, mini-joystick, scroll wheel, trackball, game pads or game controllers, etc. In embodiments with more than one actuator, each actuator may have a different rotational capability in order to create a wide range of haptic effects on the device. Not all elements illustrated in FIG. 1 will be included in each embodiment of system 10. In many embodiments, only a subset of the elements are needed.

In one embodiment, system 10 is a multi-channel haptic device, meaning processor 12 generates more than one haptic effect channel (i.e., a haptic effect signal that generates a haptic effect), and each channel is output/sent to a separate actuator or other haptic output device. In one embodiment, system 10 generates a haptic effect channel that corresponds to each channel of audio data, such as the left and right channels of stereo audio data. In one embodiment, the haptic effect channels/signals can be automatically generated from the audio channels, as disclosed in, for example, U.S. patent application Ser. Nos. 13/365,984 and 13/366,010, the disclosures of which are herein incorporated by reference.

On devices such as system 10 with multiple actuators, it is sometimes necessary to change the haptic signals sent to the actuators based on the posture or orientation of the device. For example, on system 10, actuators 18, 28 may be stereo piezo actuators, one on the left and one on the right. The tactile effects in games and videos executed on system 10 will typically be designed with the intention that some effects are felt on the left and others are felt on the right. However most devices such as system 10 allow the user to flip the device completely around, and the visual image will spin to adapt so that it is still right-side-up. Embodiments, therefore, flip the tactile effects so that the correct effects intended for the left side still play on the left side, and the ones intended for the right side play on the right.

Figure 2:
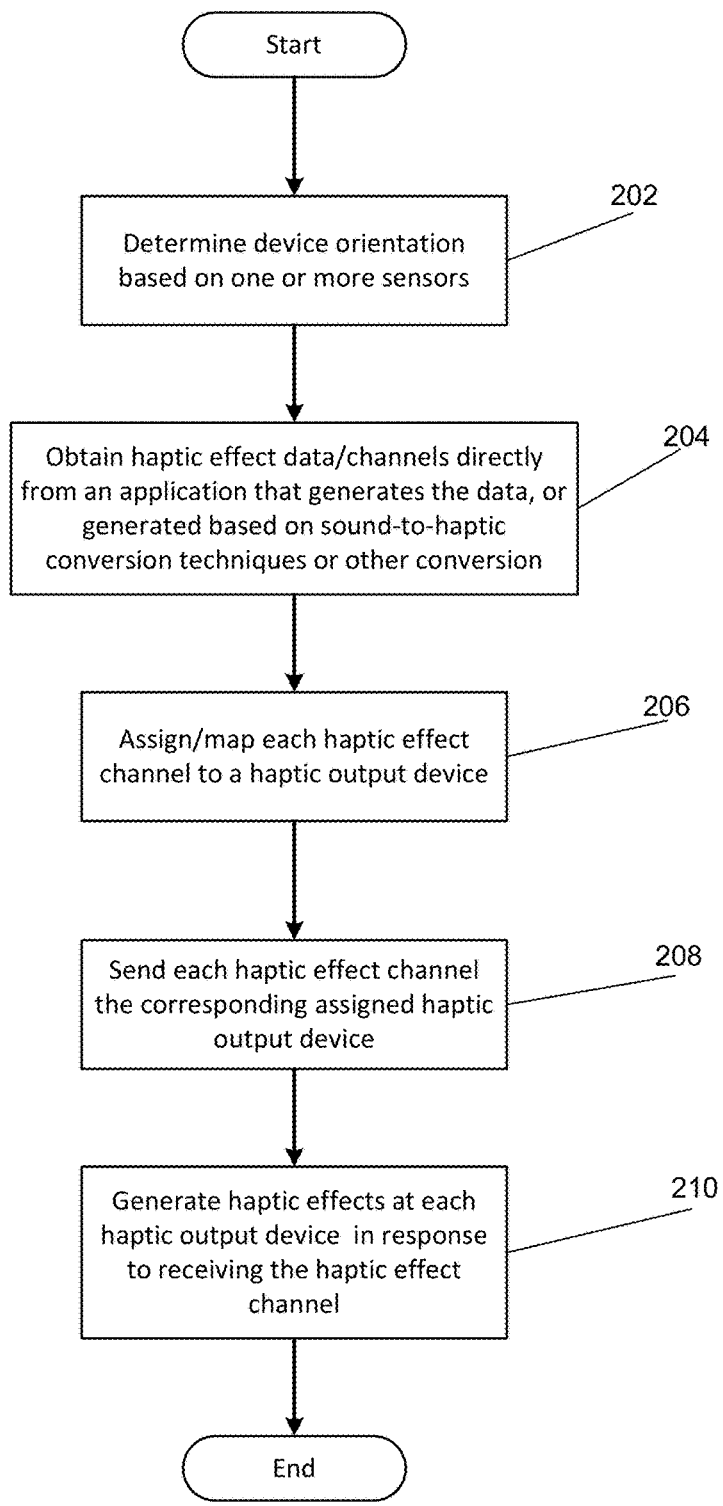
FIG. 2 is a flow diagram of the functionality of the orientated haptic effects module and the system of FIG. 1 when generating orientation adjustable haptic effect signals for actuators in accordance with one embodiment.

FIG. 2 is a flow diagram of the functionality of orientated haptic effects module 22 and system 10 of FIG. 1 when generating orientation adjustable haptic effect signals for actuators 18, 28 in accordance with one embodiment. In one embodiment, the functionality of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, the device orientation is determined based on one or more sensors, such as sensor 25. In one embodiment, sensor 25 is an accelerometer.

At 204, the haptic effect data/channels are obtained. The haptic effect data can be obtained directly from an application that generates the data, or can be generated based on sound-to-haptic conversion techniques or other conversion techniques. The haptic effect data includes multiple haptic effect channels, where each channel is configured to be directed to a different haptic output device, such as a left or right actuator.

At 206, each haptic effect channel at 204 is assigned/mapped to an individual haptic output device.

At 208, each haptic effect channel is sent to the corresponding assigned haptic output device. The haptic output devices can be local or remote from system 10.

At 210, each haptic output device generates haptic effects in response to receiving the haptic effect channel.

Figure 3:
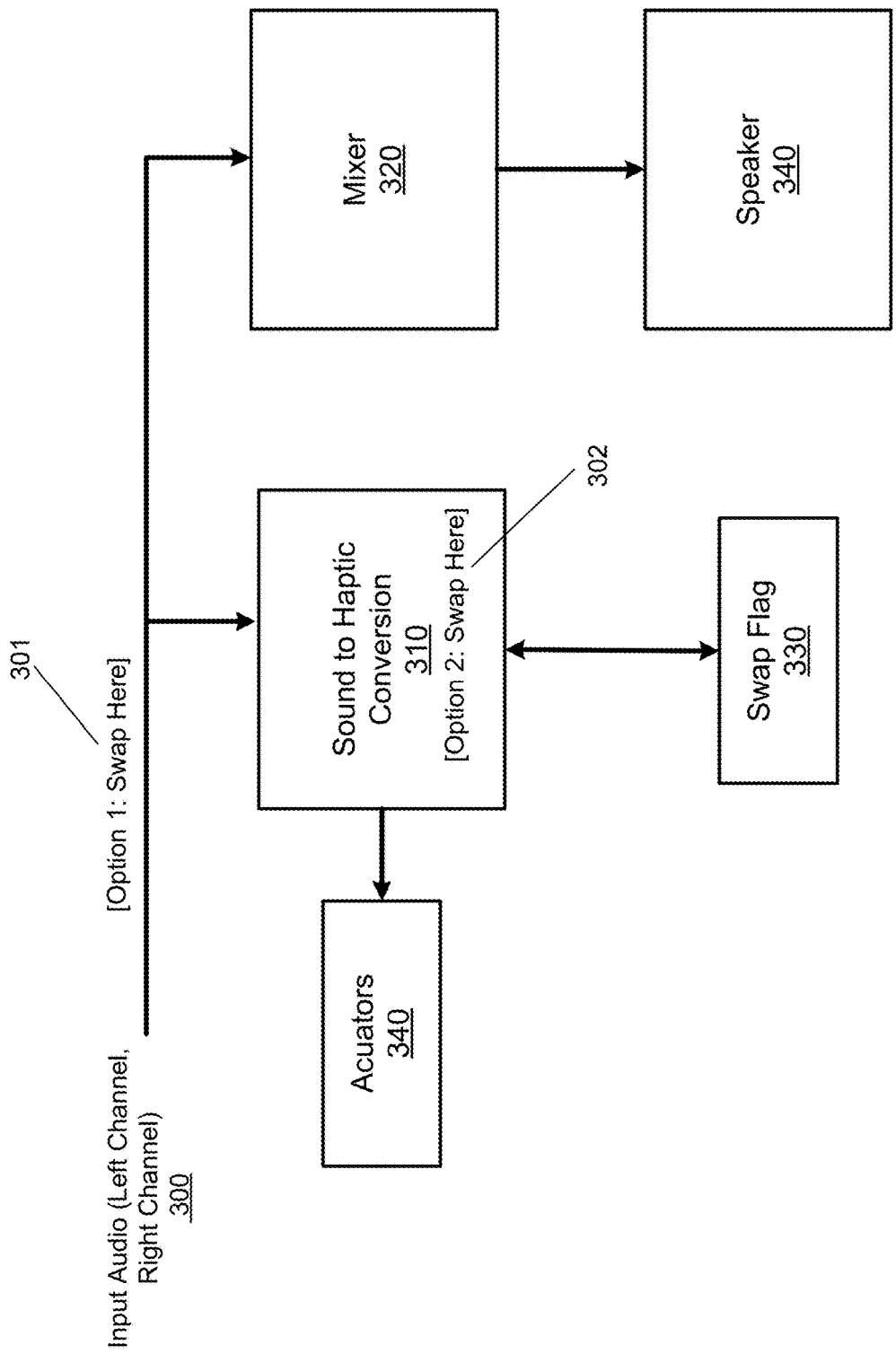
FIG. 3 is a block diagram of an embodiment of the present invention that uses sound to haptic conversion to generate haptic effect channels.

FIG. 3 is a block diagram of an embodiment of the present invention that uses sound to haptic conversion to generate haptic effect channels. In the embodiment of FIG. 3, audio data is played at 300 and includes a left audio channel and a right audio channel. However, in the example of FIG. 3, because the orientation of the playback device (e.g., system 10 of FIG. 1) has changed, the actuator 304 that was originally on the left side is now on the right side, and vice versa. Therefore, it is determined that the left audio channel should be swapped with the right audio channel.

In Option 1, the audio channels can be swapped at 301, before being received by a sound to haptic conversion module 310, which converts each audio channel to a haptic effect channel, and before being received by a mixer 320. If Option 1 is used, a flag will be set in swap flag 330 to indicate that the channels have been swapped. Therefore, sound to haptic conversion module 310 can proceed to generate haptic effect channels without concern for the orientation of the device.

In Option 2, sound to haptic conversion module 310 receives un-swapped data, and determines from swap flag 330 that the channels need to be swapped. Module 310 can then include the swapping functionality as part of the sound to haptic conversion functionality before outputting haptic channels to the mapped actuators 340.

Although embodiments described above consider two directions when determining mapping (i.e., left and right), other embodiments can consider four directions (i.e., top, bottom, left, right), or any other number of directions, depending on the number and placement of the haptic output devices. Further, rather than left and right, the haptic output devices could be on the front and back of a device, or in some other arrangement. The mapping of haptic channels may also be based on hand position, grasp strength or grasp style (i.e., the way the user is holding the device) in addition to or in place of the orientation of the device. For example, if the user is tightly grasping the device on the left side, while barely grasping the device on the right side, one of the haptic channels may be mapped to the tightly grasped side, and the other haptic channel may be mapped to the lightly grasped side. Further, the volumes or "magnitudes" of the haptic channels can be adjusted according to the grasps. For example, the side being tightly grasped could be left at regular magnitude, while the side that is lightly grasped could be increased in magnitude.

In some embodiments disclosed above, the device is rotated 180 degrees so that, for example, the left side is swapped with the right side. However, in some instances, a device with two actuators, one on each side, may be rotated 90 degrees or some other amount less than 180 degrees. In one embodiment, one or more of the following mapping/assigning of channels may occur:

The left and right haptic channels are mixed into a single "center" channel to be played on both actuators.

No mixing—instead the left haptic effect is played on the actuator that was most recently on the left side, and the right haptic effect is played on what was the right actuator. This will provide the most consistent experience.

Some other attributes are used to determine which actuator to play on (e.g., one may be larger than the other).

In another embodiment with two actuators, the haptic signal is comprised of four-channels (e.g., left/right/front/back), and the device is rotated 90 degrees or some other amount less than 180 degrees. In this embodiment, the two channels that correspond to the current orientation (left/right OR front/back) are selected and those channels are rendered. The two off-axis channels are either dropped, or are mixed and treated as a center channel to be played on one or both of the other actuators.

In general, when embodiments, are assigning tracks of a multi-channel haptic effect to individual actuators, the first consideration is to use the effects that match the positions/axes of the actuators in the system, followed by an optional mapping of off-axis effects to one or more actuators.

Further, the haptic mapping may be modified according to where the user is touching a touch screen in a control widget. For example, a device may include a graphic touchscreen slider along the side of a multi-actuator device. The actuator closest to the user could receive a haptic command signal, while the other actuators receive no haptic signals.

The mapping may also apply to flexible devices and be dependent, for example, on whether the screen is rolled up or stretched out, and may apply to multi-cell touch screens.

Embodiments using mapping further include wearable haptic devices. For example, in one embodiment the haptic output device is a ring with multiple vibration elements. The mapping of the haptic channels can be adjusted according to the orientation of the ring. For example, which of the actuators that is currently at the top of the ring will change depending on the current orientation of the ring. When sending an "up" haptic signal (i.e., a haptic signal that imparts "up" information), the current actuator on the top of the ring will receive the up haptic effect. In another example, the user may be wearing a haptically-enabled watch on each arm. If the user swaps the watches, system 10 will determine which arm has which watch and map the haptic effects accordingly.

Further, the mapping in embodiments can occur "midstream" such as during the playing of a movie. For example, a user may be watching a movie that has stereo spatialized tactile effects on a tablet. The user pauses the movie and puts down the tablet. When the user returns and picks up the tablet, it is in the opposite orientation as before. The tablet rotates the display image to accommodate this. Further, embodiments also rotate the specialized haptic image by changing the mapping.

Although embodiments disclosed above include multiple actuators, in one embodiment the device can include a single actuator. In this embodiment, the haptic effect is changed based on how the user is holding the device rather than the orientation of the device. For example, if the actuator is on the left side, and the user is holding the device on the left side, the magnitude of the haptic effect may be relatively weak. However, if sensor 25 detects that the user is holding the device on the right side, the magnitude of the haptic effect may be relatively strong so that the user can feel that haptic effect at a distance from the placement of the actuator.

As disclosed, embodiments map haptic channels to actuators based on the orientation of the device, among other factors. Therefore, spatial haptic effects will always be generated by the appropriate haptic output device, regardless of how a mobile device, for example, is being held by a user.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to generate haptic effects on a haptically-enabled device, the generate haptic effects comprising:
    obtaining a haptic signal comprising a first haptic effect channel, a second haptic effect channel, a third haptic effect channel and a fourth haptic effect channel;
    assigning the first haptic effect channel to a first haptic output device on the haptically-enabled device and assigning the second haptic effect channel to a second haptic output device on the haptically-enabled device when a first orientation is determined; and
    assigning the third haptic effect channel to the first haptic output device on the haptically-enabled device and assigning the fourth haptic effect channel to the second haptic output device on the haptically-enabled device when a second orientation is determined.

2. The computer-readable medium of claim 1, the generate haptic effects further comprising:
    mixing the third haptic effect channel and the fourth haptic effect channel when the first orientation is determined to generate a mixed channel, and assigning the mixed channels to at least one of the first haptic output device or the second haptic output device.

3. The computer-readable medium of claim 1, the generate haptic effects further comprising:
not assigning the third haptic effect channel and the fourth haptic effect channel to any haptic output devices on the haptically-enabled device when the first orientation is determined.

4. The computer-readable medium of claim 1, wherein the haptically-enabled device is a mobile device and the first haptic effect channel corresponds to a left side of the mobile device, the second haptic effect channel corresponds to a right side of the mobile device, the third haptic effect channel corresponds to a front side of the mobile device and the fourth haptic effect channel corresponds to a back side of the mobile device.

5. The computer-readable medium of claim 1, wherein the first haptic output device comprises a first actuator and the second haptic output device comprises a second actuator.

6. The computer-readable medium of claim 1, wherein the assigning comprises remotely transmitting the haptic effect channels to the haptically-enabled device.

7. The computer-readable medium of claim 6, wherein the haptically-enabled device comprises a wearable device.

8. The computer-readable medium of claim 1, wherein the haptically-enabled device comprises a flexible device, and the first orientation is determined based on whether the flexible device is rolled up.

9. A computer implemented method to generate haptic effects on a haptically-enabled device, the method comprising:
obtaining a haptic signal comprising a first haptic effect channel, a second haptic effect channel, a third haptic effect channel and a fourth haptic effect channel;
assigning the first haptic effect channel to a first haptic output device on the haptically-enabled device and assigning the second haptic effect channel to a second haptic output device on the haptically-enabled device when a first orientation is determined; and
assigning the third haptic effect channel to the first haptic output device on the haptically-enabled device and assigning the fourth haptic effect channel to the second haptic output device on the haptically-enabled device when a second orientation is determined.

10. The method of claim 9, further comprising:
mixing the third haptic effect channel and the fourth haptic effect channel when the first orientation is determined to generate a mixed channel, and assigning the mixed channel to at least one of the first haptic output device or the second haptic output device.

11. The method of claim 9, further comprising:
not assigning the third haptic effect channel and the fourth haptic effect channel to any haptic output devices on the haptically-enabled device when the first orientation is determined.

12. The method of claim 9, wherein the haptically-enabled device is a mobile device and the first haptic effect channel corresponds to a left side of the mobile device, the second haptic effect channel corresponds to a right side of the mobile device, the third haptic effect channel corresponds to a front side of the mobile device and the fourth haptic effect channel corresponds to a back side of the mobile device.

13. The method of claim 9, wherein the first haptic output device comprises a first actuator and the second haptic output device comprises a second actuator.

14. The method of claim 9, wherein the assigning comprises remotely transmitting the haptic effect channels to the haptically-enabled device.

15. The method of claim 14, wherein the haptically-enabled device comprises a wearable device.

16. The method of claim 9, wherein the haptically-enabled device comprises a flexible device, and the first orientation is determined based on whether the flexible device is rolled up.

17. A haptic system comprising:
a processor;
a first haptic output device coupled to the processor;
a second haptic output device coupled to the processor;
a third haptic output device coupled to the processor;
a fourth haptic output device coupled to the processor;
an orientation sensor coupled to the processor; and
a haptic effect mapper module coupled to the processor that maps a haptic effect channel to a haptic output device based on an orientation of the system, the mapping comprising:
obtaining a haptic signal comprising a first haptic effect channel, a second haptic effect channel, a third haptic effect channel and a fourth haptic effect channel;
assigning the first haptic effect channel to the first haptic output device and assigning the second haptic effect channel to the second haptic output device when a first orientation is determined; and
assigning the third haptic effect channel to the first haptic output device and assigning the fourth haptic effect channel to the second haptic output device when a second orientation is determined.

18. The haptic system of claim 17, further comprising a transmitter coupled to the processor;
wherein the assigning comprises remotely transmitting the haptic effect channels to the haptic output devices using the transmitter.

19. The haptic system of claim 18, wherein the haptic effect channels are remotely transmitted to a wearable device.

20. The haptic system of claim 18, the mapping further comprising not assigning the third haptic effect channel and the fourth haptic effect channel to any haptic output devices on the haptic system when the first orientation is determined.

* * * * *